United States Patent [19]
Gutowski et al.

[11] 3,871,110
[45] Mar. 18, 1975

[54] LEVEL VIAL ASSEMBLY

[75] Inventors: Antoni Pawel Gutowski, New Britain; Maarten Cornelis De Jong, Canton, both of Conn.

[73] Assignee: The Stanley Works, New Britain, Conn.

[22] Filed: Dec. 10, 1973

[21] Appl. No.: 422,981

[52] U.S. Cl. ............................................. 33/379
[51] Int. Cl. ............................................. G01c 9/28
[58] Field of Search ............ 33/379, 381, 382, 383

[56] References Cited
UNITED STATES PATENTS
3,442,024   5/1969   Don ...................................... 33/381
3,456,354   7/1969   Wright .................................. 33/381

Primary Examiner—Richard E. Aegerter
Assistant Examiner—Charles E. Phillips
Attorney, Agent, or Firm—Prutzman, Hayes, Kalb & Chilton

[57] ABSTRACT

A level vial is mounted in the web of a level frame having parallel working surfaces. The cylindrical ends of the vial is precision mounted in opposed notches provided in an aperture in the web and a pair of sleeves each having a slotted end provided with shoulders which latch against the ends of the vial when telescoped to latching position secure the vial to the web. The slots in the sleeves closely receive the web to hold the vial coplanar with the web and to provide the resilience required to accommodate expansion of the sleeves so that the shoulders may telescope to a position surrounding the vial.

3 Claims, 6 Drawing Figures

3,871,110

LEVEL VIAL ASSEMBLY

BRIEF SUMMARY OF THE INVENTION

The present invention relates to a level instrument and more particularly to a level vial construction for such an instrument and the manner of mounting the vial in a level frame.

The primary object of the present invention is to provide an improved vial assembly which accommodates the easy and accurate assembly of the vial of the level frame by an individual having no special skills without the need for the subsequent adjustment of the vial after assembly and without the need for additional fabrication steps.

Another object of the present invention is to provide an improved vial having cylindrical sleeves which telescopes over the vial and engages the web of the level to align and secure the vial in the level frame. Included in this object is the provision of such telescoping sleeves which are snap fitted over the ends of the vial to provide positive locking of the vial in the frame.

Other objects will be in part obvious and in part pointed out more in detail hereinafter.

A better understanding of the invention will be obtained from the following detailed description and the accompanying drawing of an illustrative application of the invention.

DESCRIPTION OF THE PREFERRED EMBODIMENT

Figure 1:
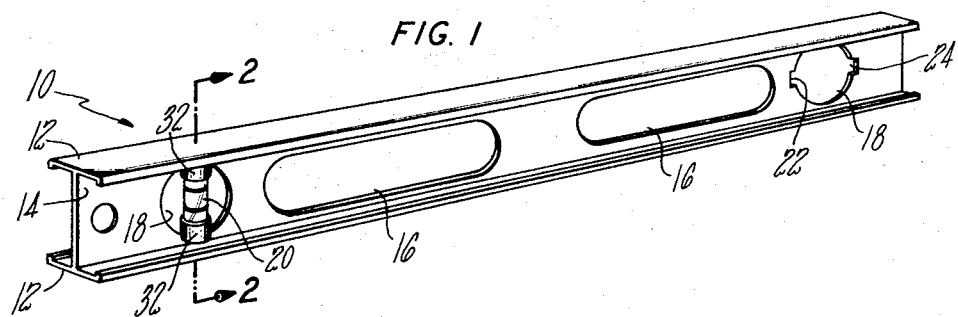
FIG. 1 is a perspective view of a level incorporating the present invention.

Referring now to the drawings in which like numerals refer to like parts in the several views, the exemplary level illustrative of this invention is provided with a frame 10 which is shown as having an I-beam configuration with two parallel working flanges 12 connected by a central web 14. The frame 10 is preferably made of metal so as to be warp free and where lightness is required, the metal employed may be one of the available alloys of aluminum, magnesium or the like.

The web 14 is cut away as at 16 to reduce its weight and to provide a hand grip for the level. The web is also provided with a plurality (shown in FIG. 1 as being 2 in number) of longitudinally spaced circular apertures 18 to accommodate one or more level vials 20. As shown, each aperture 18 is provided with a pair of diametrically opposed notches 22, 24 to closely receive the ends 26 of the vial at a preselected angle relative to the parallel working flanges 12. The vial 20 is shown in FIG. 1 as being installed perpendicular to the working flanges 12 although any other desired angle may be selected.

The notches 22, 24 are precision formed relative to the flanges 12 of the frame, and the ends of the vial 20 are precision formed so as to be of the same dimension as the notches. When so constructed, the vial 20 may be precisely and accurately aligned with the working flanges 12 of the frame when the vial is assembled in the frame with its longitudinal axis coincident with the plane of the web of the frame.

Preferably, and as illustrated, the vial 20 has a cylindrical outer surface and a cavity 30 within the vial is barrel-shaped and has a longitudinal axis coincident with the axis of the outer cylindrical surface of the vial 20. With such construction, the rotative disposition of the vial relative to the frame will not affect the accuracy of the cavity relative to the working flanges 12. Also the side walls of the notches 22, 24 are parallel to each other, and to the working flanges 12, so that axial movement of the vial within the notches does not affect the accuracy of the mounting of the vial in the frame.

Figure 2:
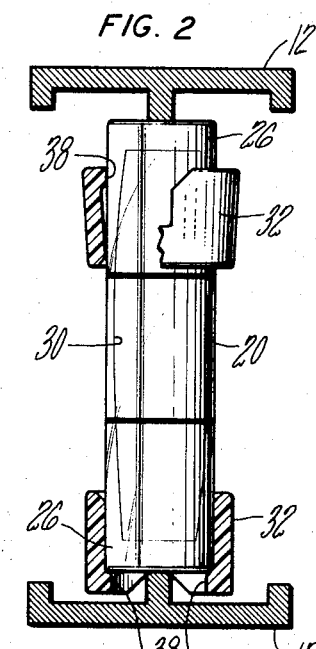
FIG. 2 is an enlarged cross-sectional view along the lines 2—2 of FIG. 1.
Figure 5:
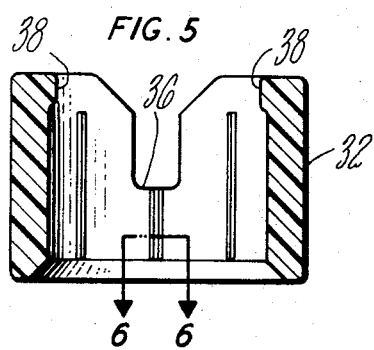
FIG. 5 is a cross-sectional view taken along the lines 5—5 of FIG. 4.
Figure 3:
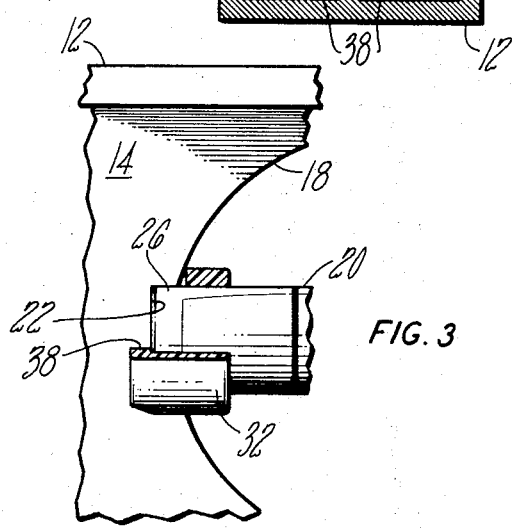
FIG. 3 is a fragmentary enlarged plan view showing a telescoping sleeve in its locking position.
Figure 6:
FIG. 6 is a further enlarged fragmentary cross-sectional view taken along the lines 6—6 of FIG. 5.

According to this invention, there is provided a novel mounting means for the precision support of the vial 20 on the web 14. As best shown in FIG. 2, these mounting means comprise a pair of identical sleeves 32, formed of a suitable material such as an acetal resin or polypropolene, which are telescopically received over the vial.

Figure 4:
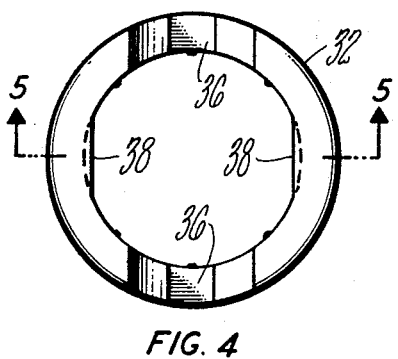
FIG. 4 is a further enlarged end view of a telescoping sleeve used in the practice of this invention.

The sleeves 32 are dimensioned to telescope over the ends of the vial as shown in FIG. 2. In order to accommodate manufacturing variations of tolerances, the sleeves are provided with a plurality of small longitudinally extending ribs (best shown in FIG. 4) which permit a tight fit of the sleeve over the vial while accommodating a low friction force for resisting relative sliding movement therebetween. The inner periphery of one end of each sleeve 32 is provided with flats or shoulders 38 to result in radially inwardly projecting abutments or shoulders 38 as best shown in FIG. 4. These shoulders 38 are spaced apart a distance less than the diameter of the vial 20. Slots 36 formed in the ends of the sleeves intermediate the shoulders 38 provide the resilience necessary for expanding the sleeve so that the sleeves may pass over the ends of the vial 20. The slots 36 serve the additional function of closely receiving the web of the level to locate the vial coplanar with the web 14 and to permit the sleeves to telescope beyond the end of the vial to a position where the shoulders 38 are snap-fitted into a locking position beyond the ends of the level vial to secure the level vial in place.

As shown in FIG. 2, the vial may be assembled in the level frame by placing one end of the vial in the notch 22 with the sleeve snap-fitted into its locking and retaining position with the slot 36 embracing the web 14. The other sleeve 32 may then be telescoped to a similar locking and retaining position relative to the other end of the vial to complete the assembly of the vial wherein the shoulders 38 thereof are snap-fitted over the end of the vial with the slots 36 snugly receiving the web 14 of the level frame without the need for adhesives to secure the sleeves in place or for the cover plates customarily used on opposite sides of the web to mount vials on a level frame.

From the foregoing, it is readily apparent that this invention provides a level having a vial provided with telescoping sleeves which are snap-fitted into final assembled position for the precision assembly of the vial on the frame. It is further apparent that this invention provides a vial design and a manner of mounting the vial in a level frame which may be accomplished without the use of special skills, and wherein the telescoping sleeves for mounting the vial in the frame are locked into assembled position without the need to use any bonding agent or other securing means.

As will be apparent to persons skilled in the art, various modifications, adaptations and variations of the foregoing specific disclosure can be made without departing from the teachings of the present invention.

We claim:

1. A level comprising a frame provided with parallel working surfaces and an interconnecting web, said web providing a pair of oppositely directed notches, an elongated vial positioned with its ends precision fitted in said pair of notches for mounting the vial at a preselected relationship relative to the working surfaces with the longitudinal axis of the vial generally parallel with the plane of the web, and a pair of generally cylindrical sleeves telescopically received over the ends of the vial, an inwardly directed shoulder at one end of each of said sleeves restricting the opening of said sleeves to a diameter less than the diameter of said vial, said one end of said sleeves being slotted to accommodate the expansion of said one end of said sleeves so that the sleeves may expand to a position where the shoulders surround the vial to permit the removal and assembly of the vial on the web, the slots in said one end of said sleeves being further dimensioned to closely receive the web, said slots of the sleeves and said shoulders of the sleeves being so related that when the sleeves are moved into a latching position the slots of the sleeves closely receive the web and the shoulders of the sleeves snap into locking engagement with the ends of the vial.

2. The level of claim 1 wherein spaced longitudinally extending ribs are provided by the inner periphery of said sleeves.

3. The level of claim 1 wherein the slots in said one end of each of said sleeves are alternate with said shoulders around the periphery of said one end of said sleeves.

* * * * *